United States Patent [19]

Schick

[11] Patent Number: 4,641,398
[45] Date of Patent: Feb. 10, 1987

[54] DEVICE FOR PROVIDING AN ARTICULATED COUPLING BETWEEN TWO COMPLEMENTARY SERIES OF BELT-FASTENERS

[75] Inventor: Jean-François Schick, Paris, France

[73] Assignee: Goro S.A., Chelles, France

[21] Appl. No.: 799,723

[22] Filed: Nov. 18, 1985

[30] Foreign Application Priority Data

Dec. 11, 1984 [FR] France .................... 84 18870

[51] Int. Cl.⁴ .................................... F16G 3/02
[52] U.S. Cl. ..................... 24/33 R; 24/33 B; 24/33 M; 24/33 P
[58] Field of Search ............. 24/33 R, 33 B, 33 M, 24/33 A, 33 C, 33 P, 31 H, 31 W

[56] References Cited

U.S. PATENT DOCUMENTS

| | | | |
|---|---|---|---|
| 1,157,499 | 10/1915 | Bliss | 24/33 M |
| 1,813,311 | 7/1931 | Nyborg | 24/33 P |
| 1,975,862 | 10/1934 | Olsen | 24/33 B |
| 2,069,385 | 2/1937 | Olsen | 24/33 M |
| 2,145,455 | 1/1939 | Olsen | 24/33 B |
| 2,272,527 | 2/1942 | Koester | 24/33 B |
| 2,490,195 | 12/1949 | Beach | 24/33 B |
| 2,962,782 | 12/1960 | Beach | |
| 3,327,359 | 6/1967 | Wiese | 24/33 R |

FOREIGN PATENT DOCUMENTS

| | | | |
|---|---|---|---|
| 109396 | 1/1940 | Australia | 24/33 P |
| 368962 | 4/1930 | Belgium . | |
| 805144 | 3/1951 | Fed. Rep. of Germany . | |
| 926645 | 3/1955 | Fed. Rep. of Germany . | |
| 2240013 | 2/1974 | Fed. Rep. of Germany . | |
| 2507474 | 8/1976 | Fed. Rep. of Germany . | |
| 720857 | 2/1932 | France . | |
| 2380471 | 9/1978 | France . | |
| 128169 | 6/1919 | United Kingdom . | |

Primary Examiner—Victor N. Sakran
Attorney, Agent, or Firm—Young & Thompson

[57] ABSTRACT

A device for coupling the hinge-knuckles of two complementary series of belt-fasteners fixed respectively on each edge of a conveyor belt is constituted by a series of independent rod segments. The maximum length of each segment corresponds to the length of the hinge-knuckles of two opposite belt-fasteners. The rod segments have relatively displaced portions each corresponding to the width of one hinge-knuckle and are thus stationarily fixed in the longitudinal direction after positioning. The different segments are initially joined together by means of at least one temporary coupling member which is readily shearable at the time of initial use and troughing of the conveyor belt.

8 Claims, 13 Drawing Figures

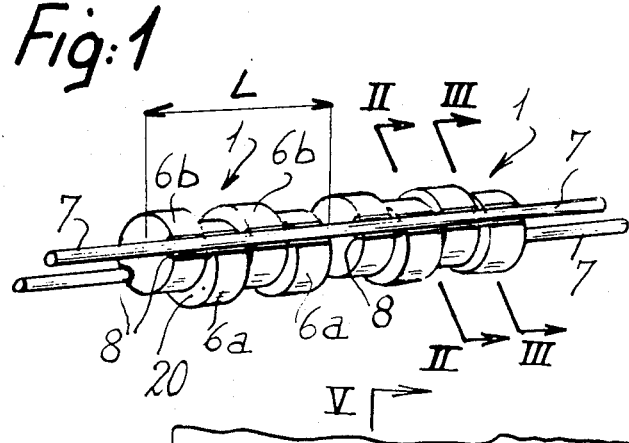
Fig. 1
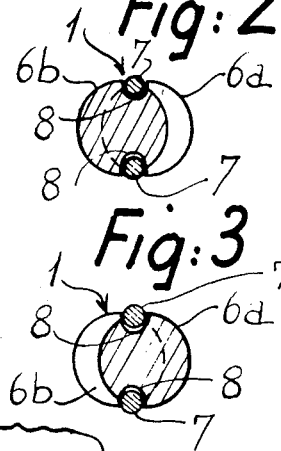
Fig. 2
Fig. 3
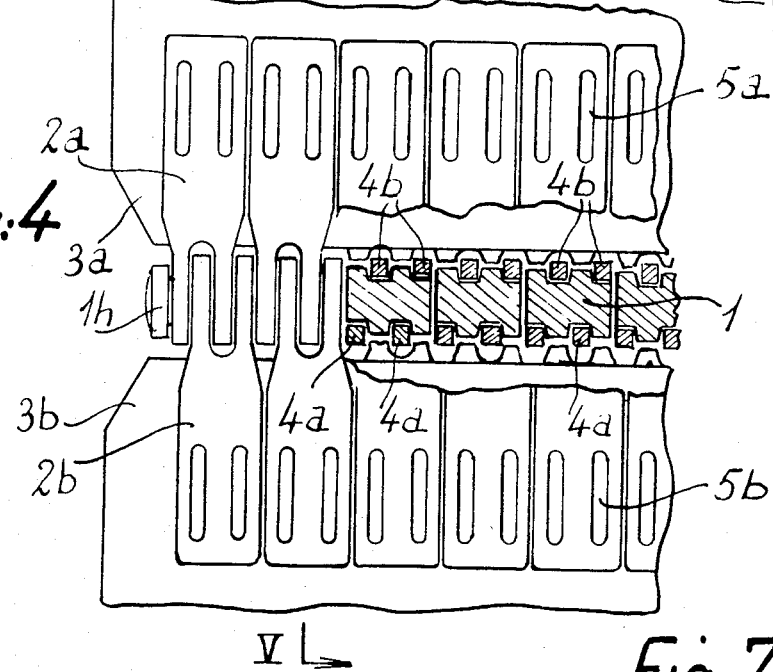
Fig. 4
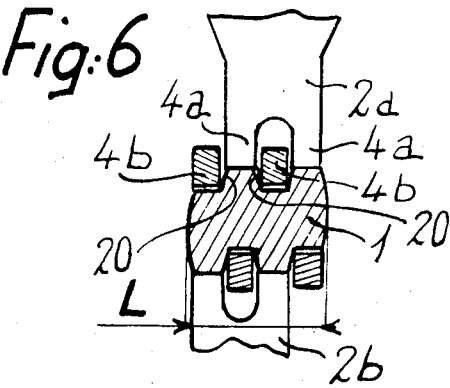
Fig. 6
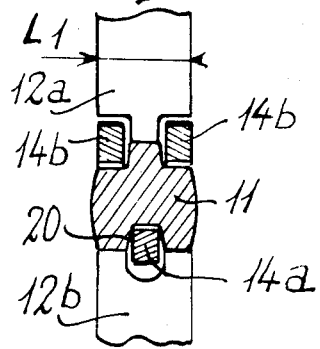
Fig. 7

DEVICE FOR PROVIDING AN ARTICULATED COUPLING BETWEEN TWO COMPLEMENTARY SERIES OF BELT-FASTENERS

BACKGROUND OF THE INVENTION

1. Field of the Invention

The present invention relates to the devices employed for joining together two successive portions of a conveyor belt.

2. Description of the Prior Art

A joint of this type is usually formed by fitting two complementary series of metallic belt-fasteners on the ends of the two portions to be joined together, then coupling said two series of fasteners by means of a hinge-pin which is passed through the entire set of inter-engaged hinge-knuckles of these fasteners. As a general rule, the hinge-pin is formed by a cable made up of twisted wires which have the function of endowing the cable with the requisite degree of flexibility in the transverse direction. This condition is in fact essential in order to ensure that the conveyor belt can assume an inwardly curved transverse profile during service and thus take the shape of a trough on the belt-supporting rollers.

During recent years, a certain number of solutions have been devised for increasing the mechanical strength of belt-fasteners of the type under consideration together with their hinge-knuckles. However, it has not been possible up to the present time to produce a similar reinforcement of the connecting hinge-pins of said belt-fasteners by reason of the very fact that these latter must possess suitable flexibility in the transverse direction. In consequence, these hinge-pins constitute the weak point of belt-coupling devices of the type considered.

In order to correct some of the defects of the connecting hinge-pins of these devices, a certain number of solutions have already been proposed. Thus German Pat. No. 805,144 relates to a coupling pin of this type on which are welded metal sleeves disposed at predetermined intervals. By means of these sleeves, it is possible to cut a coupling pin of this type at an intermediate point without separating the wires from each other. However, this solution fails to achieve any real increase in mechanical strength of the coupling pin.

German Pat. No. 926,645 describes a hinge-pin of the type under consideration over which are threaded a series of metal sleeves arranged in succession. The presence of these sleeves protects the hinge-pin from any direct contact with the knuckles of the coupling elements while nevertheless retaining a certain degree of flexibility of said hinge-pin in order to permit troughing of the conveyor belt. However, this solution does not really have the effect of enhancing the mechanical strength of the hinge-pin.

U.S. Pat. No. 2,962,782 and French Pat. No. 720,857 describe hinge-pins of the type under consideration in which provision is made for a protective outer sheath of flexible material. This design concept is likewise intended to achieve protection of the hinge-pin but does not result in higher mechanical strength.

Similar arrangements are also found in the case of the hinge-pins described in German Pat. Nos. 2,240,013 and 2,507,474. Again in this instance, protective metal sleeves are thus passed over hinge-pins of the type considered and the same applies to German Pat. No. 926,645.

SUMMARY OF THE INVENTION

For the different reasons set forth in the foregoing, the object of the present invention is to provide an articulated coupling device which is intended to replace the hinge-pins of the type recalled earlier and which is so designed as to have considerably higher mechanical strength than the aforementioned hinge-pins while at the same time offering the desired flexibility.

To this end, the device in accordance with the invention is distinguished by the following features:

said device is constituted by a series of independent elements designed in the general form of rod segments having a circular cross-section and placed one after another in succession, the length of each rod segment being of limited value corresponding at a maximum to the length of the hinge-knuckles of two belt-fasteners located in oppositely-facing relation;

said elements have relatively displaced portions each corresponding to the width of one hinge-knuckle so as to ensure that said elements are thus stationarily fixed in the longitudinal direction after positioning;

the different elements are initially joined together through the intermediary of flexible means providing a temporary coupling which is capable of shearing at the time of subsequent troughing of the conveyor belt.

The above-mentioned temporary coupling is intended to disappear very rapidly as soon as said conveyor belt is put into service. Under these conditions, the constituent elements of the device in accordance with the invention are completely independent of each other, thus permitting the desired degree of freedom of troughing (inward bending) of the conveyor belt by virtue of the arrangement adopted for the belt-supporting rollers or so-called carriers. However, since the elements aforesaid are of limited length in each case, they can be designed in the form of rigid elements having considerably higher mechanical strength than the flexible hinge-pins employed up to the present time.

The means for temporary coupling of the different elements of the present device can be constituted by a longitudinal strip engaged in grooves formed for this purpose on the periphery of said elements. However, the temporary coupling means aforesaid can also consist of a wire having a very small cross-section and low strength on which the elements of the present device are threaded. Said coupling means can also consist of a sheath within which said elements are housed.

BRIEF DESCRIPTION OF THE DRAWINGS

Other features of the invention will be more apparent upon consideration of the following description and accompanying drawings, wherein:

FIG. 1 is a fragmentary view in perspective showing a first embodiment of the coupling device in accordance with the invention;

FIGS. 2 and 3 are sectional views taken along two relatively displaced planes II—II and III—III of FIG. 1;

FIG. 4 is a fragmentary top view of a conveyor-belt joint formed by means of said coupling device;

FIG. 6 is a fragmentary sectional view taken along line VI—VI of FIG. 5;

FIGS. 7 and 8 are similar views corresponding to alternative embodiments;

DESCRIPTION OF THE PREFERRED EMBODIMENTS

Figure 5:
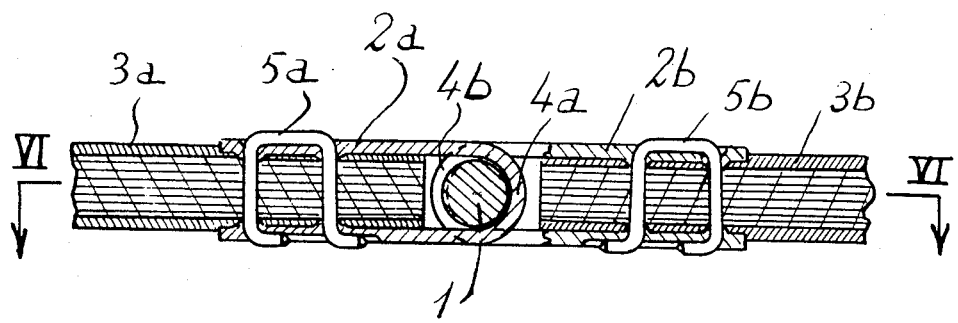
FIG. 5 is a sectional view taken along line V—V of FIG. 4.

In the example which is illustrated in FIGS. 1 to 6, the coupling device in accordance with the invention is constituted by a series of independent elements 1 designed in the general form of rod segments which have a circular cross-section and are disposed one after another in succession. These elements are formed of material having high mechanical strength such as steel, for example, or any other suitable metal. Manufacture of said elements is carried out by cutting and die-stamping of a strip having a corresponding cross-section. The elements thus produced are rigid elements of solid material.

These elements are intended to replace the hinge-pin which is usually employed for coupling two complementary series of belt-fasteners 2a and 2b which are fitted beforehand on the edges of the two conveyor-belt end portions 3a and 3b to be joined together. In consequence, the assembly formed by said elements is intended to be threaded through the transverse passageway formed by the different hinge-knuckles 4a and 4b of said belt-fasteners when these latter are interengaged as shown in FIG. 4. In accordance with conventional practice, the belt-fasteners 2a and 2b can be fixed on the two end portions 3a and 3b of the conveyor belt by means of wire staples 5a and 5b or by means of any other suitable elements such as rivets, for example. However, the belt-fasteners of each row are independent of each other or else initially joined together by means of a flexible element which is subsequently capable of shearing during operation of the conveyor belt.

The length L of each element 1 of the device in accordance with the invention is very limited. Thus, as shown in FIG. 6, said length L is equal at a maximum to the total space occupied in the transverse direction by the two hinge-knuckles 4a of the belt-fastener 2a and the hinge-knuckles 4b of the belt-fastener 2b which is located opposite to this latter. Said length L therefore corresponds to the sum of the total width of these four hinge-knuckles and the clearances allowed between these latter.

The sole function of each element 1 is in fact to provide an articulated coupling between two belt-fasteners 2a and 2b located opposite to each other. The object of this arrangement is to allow the belt-fasteners of each row to remain independent of each other.

Each element 1 of the device in accordance with the invention comprises relatively displaced portions having a width corresponding to that of the different respective hinge-knuckles 4a and 4b. Thus in the example illustrated in FIGS. 1 to 6, each element 1 comprises four separate and distinct portions displaced with respect to each other, namely two portions 6a which are displaced with respect to two other portions 6b. The portions 6a are intended to fit in position within the hinge-knuckles 4a of a belt-fastener 2a whilst the portions 6b are intended to fit within the hinge-knuckles 4b of the belt-fastener 2b which is located opposite. When tension is applied to the conveyor belt under service conditions, the belt-fasteners 2a and 2b of the two rows take up the respective positions shown in FIG. 6, thereby preventing any possibility of displacement of the coupling elements 1 in the transverse direction.

The different elements 1 constituting the device under consideration are initially joined to each other by temporary coupling means. In the example shown in FIGS. 1 to 6, these means consist of two strips 7 of flexible material which are engaged in longitudinal grooves 8 formed in the periphery of the elements 1.

Thus the different elements 1 form a single-unit assembly which can readily be engaged within the transverse passageway constituted by interassembly of the hinge-knuckles 4a and 4b of the two rows of belt-fasteners. Correct positioning of each element 1 can thus be very easily obtained in such a manner as to ensure that the relatively displaced portions 6a and 6b of each element are placed exactly opposite to the hinge-knuckles 4a and 4b respectively of the two corresponding and oppositely-facing belt-fasteners. If necessary, the device as thus constituted can be provided with an end element 1 having a projecting head 1h which, by abutting application against the hinge-knuckle of the corresponding belt-fastener, ensures correct positioning of all the other elements 1 within the hinge-knuckles 4a and 4b.

Figure 11:
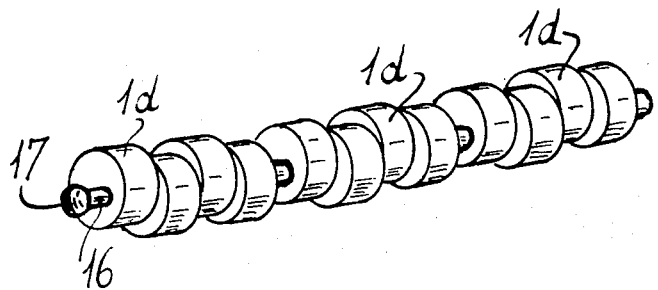
Figure 12:
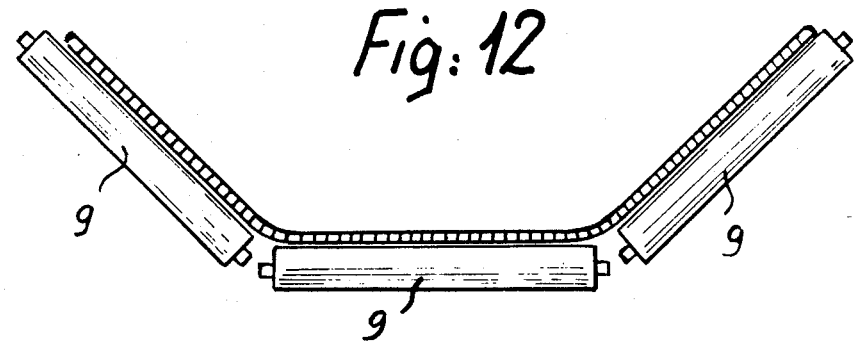
FIG. 12 is a schematic transverse sectional view of a conveyor belt provided with a joint formed by means of the coupling device in accordance with the invention, said conveyor belt being shown in the utilization position.

However, as soon as the corresponding conveyor belt is in service, it is caused to assume a troughed shape as shown in FIG. 11 by virtue of the arrangement of the carrier rollers 9. The precise effect of troughing of the conveyor belt is to cause rupture of the strips 7 which had hitherto served as temporary coupling means between the different elements 1. Under these conditions, these elements are completely independent of each other from that time onward. Since the belt-fasteners 2a and 2b of the two rows were already independent of each other, the hinged-connection system constituted by the combination of belt-fasteners and the coupling device in accordance with the invention does not in any way interfere with troughing of the conveyor belt. The advantage thus obtained is therefore the same as in the case of a connecting hinge-pin consisting of a flexible cable formed by twisted wires.

On the other hand, the mechanical strength of the coupling device in accordance with the invention is considerably higher than that of a cable-type hinge-pin. This is due to the fact that each constituent element 1 of said device is a solid element which can be formed of material having high mechanical strength. It is worthy of note that the flanks 20 of the annular shoulders formed by the relative displacement of the portions 6a and 6b are inclined (as shown in FIG. 6) so as to ensure recentering of each element 1 of the present coupling device with respect to the hinge-knuckles of each belt-fastener when the conveyor belt is put into service and the articulated coupling system thus formed is subjected to a tractive force.

Figure 8:
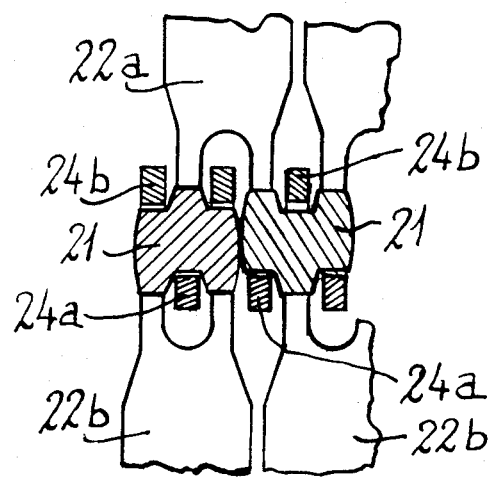

FIGS. 7 and 8 illustrate two further embodiments of the device in accordance with the invention. In the case of FIG. 7, the coupling element 11 shown in this figure has the intended function of interconnecting two series of belt-fasteners 12a and 12b. One of these belt-fasteners (12a) has a single hinge-knuckle 14a which is located at the center of said fastener and is intended to be placed between two spaced hinge-knuckles 14b provided on the oppositely-facing belt-fastener 12b.

In the case illustrated in FIG. 8, the coupling elements 21 of the device in accordance with the invention each have the intended function of interconnecting three hinge-knuckles 24a or 24b forming part of two oppositely-facing belt-fasteners 22a or 22b, each fastener being provided with two hinge-knuckles. In such a case, the fasteners of both rows are relatively displaced.

It is readily apparent, however, that the constituent elements of the coupling device in accordance with the invention could be adapted to all other types of belt-fasteners, in particular as a function of the number and distribution of the hinge-knuckles of said belt-fasteners. However, any such adaptation naturally remains subject to the condition that the necessary degree of independence must be allowed between the different belt-fasteners of the same row in order to permit subsequent troughing of the conveyor belt.

Figure 9:
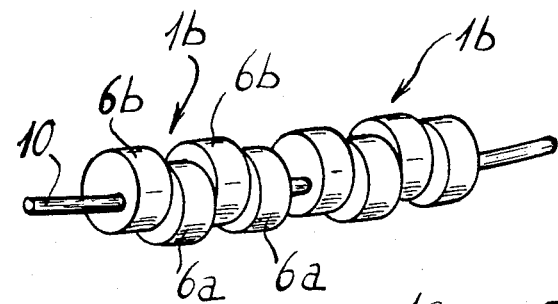
FIGS. 9, 10 and 11 are partial views in perspective showing three other embodiments of the device in accordance with the invention.

FIG. 9 illustrates another embodiment in which the means for temporary coupling of the elements 1b of the device in accordance with the invention consist of a flexible wire 10 along which said elements are threaded. Said wire has very low mechanical strength in order to fail rapidly when the corresponding conveyor belt is in service and thus to ensure that the different elements 1b are subsequently independent of each other as in the first embodiment described earlier.

It should be noted in this connection that the presence of a duct or passageway for the wire 10 within each element 1b is not liable to reduce the mechanical strength of these elements to any significant extent. The passageway thus provided is in fact of very small cross-sectional area. There is therefore no real affinity with the system contemplated in the prior art in which metal sleeves were fitted over a hinge-pin formed by a cable of twisted wires. It should be added that, in the case now under consideration, the wire 10 is simply and solely a temporary coupling member which is intended to disappear as soon as the corresponding conveyor belt is put into service.

Figure 10:
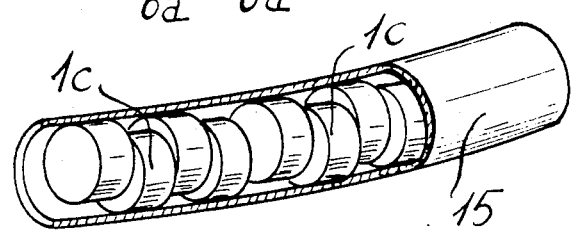

FIG. 10 illustrates another embodiment in which the means for providing a temporary coupling between the different elements 1c of the corresponding device consists of a sheath 15 of flexible material in which is housed a string of elements placed one after another in succession. This sheath has a very small thickness and is fabricated from material of such a nature as to fail as soon as the corresponding conveyor belt is put into service in order to ensure that the elements 1c of the present coupling device are endowed with complete independence with respect to each other as in the embodiments previously described.

FIG. 11 illustrates yet another embodiment in which the temporary coupling of the different elements 1d of said device is carried out by means of studs 16 provided at one end of each element. A head 17 is formed on each stud and constitutes a ball-joint which is intended to be engaged in a cavity formed in the opposite end of each element. These studs are designed to fail as soon as the conveyor belt is put into operation for the first time. Failure of the studs takes place either under the action of transverse incurvation of the belt or so-called troughing, or under the action of tensile stresses to which the studs are subjected when tension is initially applied to the belt. The result thereby achieved is the same as in the embodiments hereinabove described.

Figure 13:
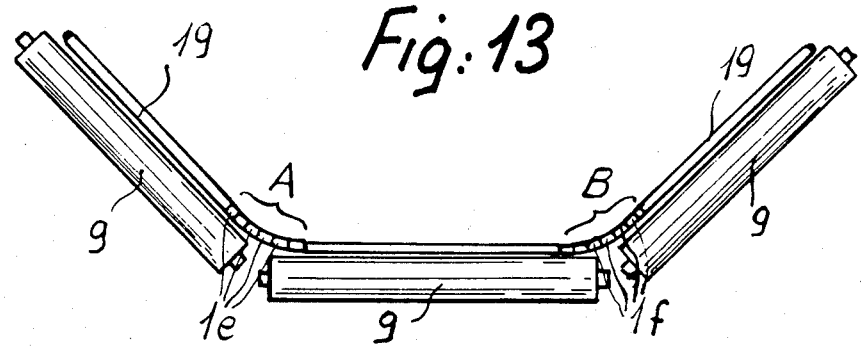
FIG. 13 is a similar view corresponding to another embodiment of the coupling device in accordance with the invention.

FIG. 13 illustrates a particular embodiment of the coupling device in accordance with the invention. In this embodiment, the device is not constituted over its entire length by a series of identical elements 1, 1a, 1b, 1c or 1d of small length. This device in fact comprises only two series of elements 1e and 1f which are localized in the zones A and B in which the conveyor belt will be bent in the form of an elbow at the time of troughing on the carrier rollers 9. Between these two series of elements 1e and 1f, the device under consideration comprises a rigid shaft 18 consisting of a rod having a circular cross-section and high mechanical strength. This device comprises in addition two similar shafts 19 located on each side of the two series of elements 1e and 1f.

This particular structure permits the desired troughing of the conveyor belt in zones in which the belt is inwardly bent so as to form an elbowed portion under operating conditions. In the other portions of the belt, it is not important to provide a coupling between the belt-fasteners by means of rigid shafts 18 and 19 since these latter are not required to form an elbow or to bend inwards when the conveyor belt is in service. However, the distribution of the flexible and rigid zones of a coupling device of this type could be modified according to requirements and applications.

It is in any case readily apparent that the coupling device in accordance with the invention is not limited solely to the examples of construction described in the foregoing. Furthermore, it should be noted that the present invention is not only directed to a coupling device as described above but is also concerned with the belt-attachment systems of the hinged connection type constituted by the combination of two rows of belt-fasteners and of a coupling device as described in the foregoing specification.

What is claimed is:

1. A device for providing an articulated coupling between the hinge-knuckles of two complementary series of belt-fasteners fixed respectively on each edge of the end portions of a conveyor belt to be joined together, wherein:

said device is constituted by a series of independent elements designed in the general form of rod segments having a circular cross-section and placed one after another in succession transversely of the conveyor belt, the length of each rod segment being of limited value corresponding at a maximum to the length of the hinge-knuckles of two belt-fasteners located in oppositely-facing relation; and said elements have relatively displaced portions each corresponding to the width of one hinge-knuckle so as to ensure that said elements are thus stationarily fixed in the longitudinal direction after position.

2. A coupling device according to claim 1, in which the different elements are initially joined together by flexible means providing a temporary coupling which is capable of shearing at the time of subsequently troughing of the conveyor belt.

3. A coupling device according to claim 2, wherein at least one longitudinal groove is formed in the external wall of each element of said coupling device and the means employed for temporary coupling of said elements consist of a longitudinal member engaged in the passageway formed by the different grooves aforesaid, said member being readily shearable.

4. A coupling device according to claim 2, wherein the means for temporary coupling the elements of said device consist of a wire on which said elements are threaded, said wire being readily shearable under the action of troughing of the conveyor belt.

5. A coupling device according to claim 2, wherein the means for temporary coupling of the elements of said device consist of a sheath within which said elements are housed, said sheath being readily shearable under the action of troughing of the conveyor belt.

6. A coupling device according to claim 1, wherein the elements of said device are joined to each other by means of studs which are readily shearable at the time of troughing of the conveyor belt.

7. A coupling device according to claim 1, wherein said device comprises two separate and distinct series of coupling elements located respectively in each elbowed zone of a troughed conveyor belt when said belt is in service, a rigid coupling shaft being disposed between two series of elements and two other similar shafts being provided on each side.

8. An attachment system providing a hinged connection between two portions of a conveyor belt, said system being constituted by two series of belt-fasteners comprising hinge-knuckles which are disposed in interfitting relation and joined together by means of a hinge-pin engaged within said hinge-knuckles, wherein said attachment system is constituted by a coupling device according to claim 1.

* * * * *